United States Patent [19]

Cline et al.

[11] Patent Number: 4,791,567
[45] Date of Patent: Dec. 13, 1988

[54] THREE DIMENSIONAL CONNECTIVITY SYSTEM EMPLOYING AN EQUIVALENCE SCHEMA FOR DETERMINING CONNECTED SUBSTRUCTURES WITHIN A BODY

[75] Inventors: Harvey E. Cline, Schenectady; William E. Lorensen, Ballston Lake; Siegwalt Ludke, Scotia, all of N.Y.

[73] Assignee: General Electric Company, Schenectady, N.Y.

[21] Appl. No.: 907,333

[22] Filed: Sep. 15, 1986

[51] Int. Cl.$^4$ ............................................. G06F 15/62
[52] U.S. Cl. .............................. 364/413.13; 364/522; 378/901; 382/16; 382/27
[58] Field of Search ................. 364/414, 521–533, 364/512; 582/16, 27; 340/728; 378/901

[56] References Cited

U.S. PATENT DOCUMENTS

| | | | |
|---|---|---|---|
| 4,418,387 | 11/1983 | Yamaguchi | 378/901 |
| 4,422,146 | 12/1983 | Yamaguchi | 378/901 |
| 4,539,640 | 9/1985 | Fry | 364/414 |
| 4,558,438 | 12/1985 | Jones | 340/738 |
| 4,641,351 | 2/1987 | Preston | 364/414 |
| 4,674,046 | 1/1987 | Ozeki | 378/901 |
| 4,694,404 | 9/1987 | Meagher | 364/518 |

Primary Examiner—Jerry Smith
Assistant Examiner—Gail O. Hayes
Attorney, Agent, or Firm—Marvin Snyder; James C. Davis, Jr.

[57] ABSTRACT

An apparatus and method for determining connected substructures within a body is disclosed. The system and method are particularly advantageous for use in medical diagnostic imaging applications. In particular, three dimensional regions exhibiting the same tissue type are similarly labeled. The system and method of the present invention is operable in any situation in which three dimensional signal patterns representing the value of one or more physical properties associated with the substructures within a body at regularly spaced grid locations within the body are presented. A subset of the original data may then be provided to a display processor, particularly one employing gradient normal shading for display of three dimensional images. Even more particularly, the present invention is related to a method and system for determining equivalence classes of objects, the objects typically comprising one or two dimensional connected regions found in a planar slice of data from magnetic resonance imaging or x-ray tomography systems.

4 Claims, 11 Drawing Sheets

| 1 | 1 | 1 | 1 | 1 | 1 | 1 | 1 | 1 | 1 | 1 | 1 | 1 |
|---|---|---|---|---|---|---|---|---|---|---|---|---|
| 1 | 1 | 0 | 0 | 0 | 0 | 0 | 0 | 0 | 0 | 0 | 1 | 1 |
| 1 | 0 | 0 | 0 | 1 | 0 | 0 | 0 | 0 | 1 | 0 | 0 | 1 |
| 1 | 1 | 0 | 1 | 1 | 1 | 0 | 0 | 1 | 1 | 1 | 0 | 1 |
| 1 | 0 | 0 | 1 | 1 | 1 | 0 | 0 | 1 | 1 | 1 | 0 | 1 |
| 1 | 0 | 0 | 1 | 1 | 1 | 0 | 0 | 1 | 1 | 1 | 0 | 1 |
| 1 | 0 | 0 | 0 | 1 | 0 | 0 | 0 | 0 | 1 | 0 | 0 | 1 |
| 1 | 0 | 0 | 0 | 0 | 0 | 0 | 0 | 0 | 0 | 0 | 0 | 1 |
| 1 | 1 | 0 | 0 | 0 | 0 | 1 | 0 | 0 | 1 | 0 | 1 | 1 |
| 1 | 1 | 1 | 1 | 1 | 1 | 1 | 1 | 1 | 1 | 1 | 1 | 1 |

FIG. 2B

| 1 | 1 | 1 | 1 | 1 | 1 | 1 | 1 | 1 | 1 | 1 | 1 | 1 |
|---|---|---|---|---|---|---|---|---|---|---|---|---|
| 1 | 1 | 0 | 0 | 0 | 0 | 0 | 0 | 0 | 0 | 0 | 0 | 1 |
| 1 | 0 | 0 | 0 | 0 | 1 | 0 | 0 | 0 | 1 | 0 | 0 | 1 |
| 1 | 0 | 0 | 0 | 1 | 1 | 1 | 1 | 1 | 1 | 0 | 0 | 1 |
| 1 | 0 | 0 | 0 | 1 | 1 | 1 | 1 | 1 | 1 | 1 | 0 | 1 |
| 1 | 0 | 0 | 0 | 0 | 1 | 1 | 1 | 1 | 1 | 0 | 0 | 1 |
| 1 | 0 | 0 | 0 | 0 | 1 | 0 | 0 | 1 | 0 | 0 | 0 | 1 |
| 1 | 0 | 0 | 0 | 0 | 0 | 0 | 0 | 0 | 0 | 0 | 0 | 1 |
| 1 | 1 | 0 | 0 | 0 | 0 | 0 | 0 | 0 | 0 | 0 | 0 | 1 |
| 1 | 1 | 0 | 0 | 0 | 1 | 1 | 0 | 0 | 0 | 0 | 1 | 1 |
| 1 | 1 | 1 | 1 | 1 | 1 | 1 | 1 | 1 | 1 | 1 | 1 | 1 |

FIG. 3A

| A | A | A | A | A | A | A | A | A | A | A | A | A |
|---|---|---|---|---|---|---|---|---|---|---|---|---|
| A | A |   |   |   |   |   |   |   |   |   | A | A |
| A |   |   |   | B |   |   |   | C |   |   |   | A |
| A | A |   | B | B | B |   |   | C | C | C |   | A |
| A |   |   | B | B | B |   |   | C | C | C |   | A |
| A |   |   | B | B | B |   |   | C | C | C |   | A |
| A |   |   |   | B |   |   |   |   | C |   |   | A |
| A |   |   |   |   |   |   |   |   |   |   |   | A |
| A | A |   |   |   |   | A |   |   | A |   | A | A |
| A | A | A | A | A | A | A | A | A | A | A | A | A |

FIG. 3B

| D | D | D | D | D | D | D | D | D | D | D | D | D |
|---|---|---|---|---|---|---|---|---|---|---|---|---|
| D | D |   |   |   |   |   |   |   |   |   |   | D |
| D |   |   |   |   | E |   |   | E |   |   |   | D |
| D |   |   |   | E | E | E | E | E |   |   |   | D |
| D |   |   |   | E | E | E | E | E | E |   |   | D |
| D |   |   |   |   | E | E | E | E |   |   |   | D |
| D |   |   |   | E |   |   |   | E |   |   |   | D |
| D |   |   |   |   |   |   |   |   |   |   |   | D |
| D | D |   |   |   |   |   |   |   |   |   |   | D |
| D | D |   |   | D | D |   |   |   |   | D | D |
| D | D | D | D | D | D | D | D | D | D | D | D | D |

SLICE No. 1

SLICE No. 2

SLICE No. 3

SLICE No. 4

FIG. 4C
ADJACENCY TABLES

| SLICES 1,2 | A | B | C |
|---|---|---|---|
| D | 0 | – | – |
| E | – | X | – |
| F | – | – | X |

| SLICES 2,3 | D | E | F |
|---|---|---|---|
| G | 0 | – | – |
| H | – | X | X |

| SLICES 3,4 | G | H |
|---|---|---|
| I | 0 | – |
| J | – | X |
| K | – | X |

FIG. 5A

PAIRS: (B,E); (C,F); (E,H); (F,H); (H,J); (H,K)

| MEMORY LOCATION | 1 | 2 | 3 | 4 | 5 | 6 | 7 | 8 | 9 | 10 | 11 |
|---|---|---|---|---|---|---|---|---|---|---|---|
| INITIAL LABELS | A | B | C | D | E | F | G | H | I | J | K |
| SWITCH (B,E) | A | TEST: B AND E NOT YET CONNECTED; E↔B | C | D | B | F | G | H | I | J | K |
| SWITCH (C,F) | A | E | TEST: C AND F NOT YET CONNECTED; F↔C | D | B | C | G | H | I | J | K |
| SWITCH (E,H) | A | TEST: E→B→E E IS NOT YET CONNECTED TO H; H↔F | F | D | B | C | G | E | I | J | K |
| SWITCH (F,H) | A | TEST: F→C→F F IS NOT YET CONNECTED TO H; F↔H | H | D | B | C | G | E | I | J | K |
| SWITCH (H,J) | A | TEST: H→C→F→B→E→H H IS NOT YET CONNECTED TO J; H→J | C | D | B | C | G | E | I | H | K |
| SWITCH (H,K) | A | TEST: H→J→C→F→B→E→H H IS NOT YET CONNECTED TO K; K→H | F | D | B | C | G | E | I | K | H |
| LABEL UNSHIFTED LOCATIONS | 0 | F | J | O | B | C | O | E | O | K | H |
| DETERMINE FIRST CONNECTION CYCLE | | | | | F→B→E→H→K→J→C→F | | | | | | |
| LABEL FIRST CYCLE WITH CLASS INDICIA | 0 | 1 | 1 | 0 | 1 | 1 | 0 | 1 | 0 | 1 | 1 |

FIG. 5B

| PAIRS: | | 1 | 2 | 3 | 4 | 5 | 6 | 7 | 8 | 9 | 10 | 11 |
|---|---|---|---|---|---|---|---|---|---|---|---|---|
| MEMORY LOCATION | SAME AS IN FIG. 5A | | | | | | | | | | | |
| INITIAL LABELS | | A | B | C | D | E | F | G | H | I | J | K |
| SWITCH LOCATIONS (B,E) | TEST: E/A | A | B↔C | C | D | E | B AND E NOT YET CONNECTED F | G | H | I | J | K |
| SWITCH LOCATIONS (C,F) | TEST: E/A | A | C | B | D | E | C AND F NOT YET CONNECTED F↔G | G | H | I | J | K * |
| SWITCH LOCATIONS (E,H) | TEST: E/A | A | C | B | D | E↔B | F | G | H | I | J | K |
| | | | | | | E AND H NOT YET CONNECTED | | | | | | |
| SWITCH LOCATIONS (F,H) | TEST: E/A | A | C | B | D | H | F↔C | G | H | I | J | K |
| | | | | | | | F AND H NOT YET CONNECTED | | | | | |
| SWITCH LOCATIONS (H,J) | TEST: E/A | A | C | B | D | H | C | G | H→E | I | J↔C | K |
| | | | | | | | | | H AND J NOT YET CONNECTED | | | |
| SWITCH LOCATIONS (H,K) | TEST: E/A | A | C | B | D | H | J | G | H→E | I | C | K |
| | | | | | | | | | H AND K NOT YET CONNECTED | | | |
| LABEL UNSHIFTED LOCATIONS | | 0 | C | B | D | E | H | O | B | O | C | J |
| DETERMINE FIRST CONNECTION CYCLE | | | B→E→H→K→J→C→F→B | | | | | | | | | |
| LABEL FIRST CYCLE WITH CLASS INDICIA | | 0 | 1 | 1 | 0 | 1 | 1 | 0 | 1 | 0 | 1 | 1 |

FIG. 5C

PAIRS: (B,D); (B,F); (B,E); (D,H); (F,H); (E,I)

| | 1 | 2 | 3 | 4 | 5 | 6 | 7 | 8 | 9 |
|---|---|---|---|---|---|---|---|---|---|
| MEMORY LOCATION | | | | | | | | | |
| INITIAL LABELS | A | B | C | D | E | F | G | H | I |
| SWITCH LOCATIONS (B,D) | A | TEST: D→D | B AND D NOT YET CONNECTED B→C | D→B | E | F | G | H | I |
| SWITCH LOCATIONS (B,F) | A | TEST: F→F | B→D→B B→C | D→B | E | B AND F NOT YET CONNECTED F→D | G | H | I |
| SWITCH LOCATIONS (B,E) | A | TEST: E→E | B→F→D→B B→C | D→B | B AND E NOT YET CONNECTED E→F | F→D | G | H | I |
| SWITCH LOCATIONS (D,H) | A | TEST: E→E | D→B→E→F→D B→C | E→H | F | D | G | D AND H NOT YET CONNECTED H→G | I |
| SWITCH LOCATIONS (F,H) | A | TEST: E→E | F→D→H F→D→H B→C | E→H | F | D | G | F AND H ALREADY CONNECTED * NO SWITCHING OCCURS B | I |
| SWITCH LOCATIONS (E,I) | A | TEST: E→E | E→F→D→I→H→B B→C | E→I | F | D | G | E AND I NOT YET CONNECTED B | H |
| LABEL UNSHIFTED POSITIONS | 0 | E | 0 | I | F | D | 0 | B | H |
| DETERMINE FIRST CONNECTION CYCLE | | B→E→F→D→I→H→B | | | | | | | |
| LABEL FIRST CYCLE WITH CLASS INDICIA | 0 | 1 | 0 | 1 | 1 | 1 | 0 | 1 | 1 |

PHIR LIST : (A,D); (B,E); (C,F); (D,G); (F,H)
(G,I); (H,I); (I,J); (J,K)

THREE DIMENSIONAL CONNECTIVITY SYSTEM EMPLOYING AN EQUIVALENCE SCHEMA FOR DETERMINING CONNECTED SUBSTRUCTURES WITHIN A BODY

BACKGROUND OF THE INVENTION

The present invention is generally directed to a system for three dimensional display of connected substructures within a body. More particularly, the present invention is directed to a system for the display of medical and other images produced from magnetic resonance imaging devices and from computerized axial tomographic machines. Even more particularly, the present invention is directed to a display system in which connected anatomical features are isolated for three dimensional display and manipulation.

Computerized axial tomography and related x-ray imaging systems are capable of producing signal patterns representing the value of at least one physical property associated with substructures within a three dimensional body. In the case of medical imaging, the body typically comprises a patient or patient limb. In the case of industrial systems, the body may comprise a turbine blade or other part exhibiting an internal structure. Additionally, magnetic resonance imaging systems are also particularly capable of generating physiological data for various biological life forms. In the cae of x-ray tomography, the physical property being measured is typically an x-ray absorption coefficient associated with various locations throughout a body. In the case of magnetic resonance imaging, nuclear precession decay signals are typically measured. However, the present invention is not confined to utilization with either computerized axial tomography systems or with magnetic resonance imaging systems. For example, positron emission tomography and single photon emission radiography systems may also be employed in conjunction with the system and method of the present invention. For the purposes of the present invention, the most relevant feature of such systems is their ability to generate signal patterns representing the value of one or more physical properties associated with various substructures within a body at regularly spaced cell or grid locations.

In three recently filed patent applications assigned to the same assignee as the present invention, systems and methods for the display of three dimensional data were disclosed. These applications are: application Ser. No. 741,391 filed June 6, 1985 titled "System and Method Employing Nonlinear Interpolation for the Display of Surface Structures Contained Within the Interior Region of a Solid Body" and application Ser. No. 741,390 filed June 6, 1985 titled "System and Method for the Display of Surface Structures Within the Interior Region of a Solid Body" and application Ser. No. 770,164 filed Aug. 28, 1985 titled "Dividing Cube System and Method for the Display of Surface Structures Contained Within the Interior Region of a Solid Body". All three of these applications are hereby incorporated herein by reference. These applications generally describe the "marching cubes" and "dividing cubes" systems for the display of shaded images on a display device such as a cathode ray tube (CRT). The present system can be thought of as a preprocessor for the production of data to be supplied to dividing cubes or marching cubes systems or to similar display systems. These systems typically employ information supplied from magnetic resonance imaging or CAT scanner x-ray systems (although they are not limited thereto). They produce a shaded image on a screen in such a manner as to create, with shading, the illusion of a true three dimensional view on a to dimensional screen. By the operator choosing certain data value ranges, it is possible for such systems to display only bone tissue, or only other, soft tissue structures. The systems also readily permit the sectioning of the data so as to produce a shaded three dimensional image which accurately depicts those structures which would be visible if the body were sliced by a plane in a specified direction. Such systems provide radiologists and surgeons with extensive preoperative information to enable them to more precisely and accurately carry out intended surgical procedures. It should be particularly noted with respect to systems of the present invention that, in general, all views are provided from a single set of data collected at one time from the patient. The data is typically collected as a sequence of tomographic slices. However, it is also possible to collect data over various periods of time, when necessary, for the purpose of monitoring temporal changes within the patient's body.

While the three dimensional display systems described in the above-identified patent applications operate to quickly and effectively display highly desirable medical information, there is nonetheless other information which is contained within the data which is not readily viewable by the above-described systems. In particular, while the systems described in the patent applications described above are capable of selectively displaying only those tissues which exhibit data values in a specified range, there may be several different organs or tissues which also exhibit physical property data values in the same range. All such structures are either entirely displayed or entirely eliminated from view in the systems described in these patent applications. For example, it would be desirable to be able to isolate a particular bone from data which relates to several different, non-connected bone structures. Likewise, it would also be desirable to display images of a vascular network isolated from surrounding tissue. Similarly, it would be desirable to display images of the brain isolated from other similar head tissues such as skin. While it is relatively easy to isolate brain tissue from surrounding bone tissue because of their different physical properties, the similarity of brain and facial tissue properties makes isolation of these tissues more difficult. However, advantage is taken in the system of the present invention of the fact that brain and facial skin tissue, for example, are not physically connected tissue structures. Accordingly, the present invention employs geometric connectivity of adjacent structures to isolate, for display purposes, select substructures within a solid body being imaged. The system described herein is seen to be particularly well adapted for use in conjunction with either the marching cubes or dividing cubes systems described above.

In another recently filed patent application assigned to the same assignee as the present invention, a system and method for the display of three dimensional data employing connectivity are also disclosed. This application is application Ser. No. 893,060 filed Aug. 4, 1986 titled "Method and Apparatus for Determining Connected Substructures Within a Body". In this application, three dimensional regions exhibiting the same tissue type are similarly labeled. Using the label information together with a seed location located in the substructure of interest, all similarly labeled connected data points are determined. The system and method of this invention is operable in the same set of circumstances as is the present invention. A subset of the original data is then typically provided to a display processor, particularly one employing gradient normal shading for display of three dimensional images. The contents of application Ser. No. 893,060 filed Aug. 4, 1986 are also incorporated herein by reference. However, one of the disadvantages of the system described in this application is its recursive nature. For three dimensional configurations and for large numbers of data points, the memory stack can become quite large. Also, the method presented in the aforementioned application requires all of the slices to be in memory at one time which, accordingly, limits the size of the computer which is practically usable with the system. While there are often time/memory tradeoffs permitted in graphic display systems, it is noted that the processing of graphical information is generally considered already to be computationally complex and inately time consuming.

SUMMARY OF THE INVENTION

In accordance with a preferred embodiment of the present invention, a method for determining connected substructures within a body comprises the following steps. Three dimensional signal patterns representing the value of at least one physical property associated with substructures within said body at regularly spaced grid locations within the body are stored in a memory means. Signal pattern values associated with planar slices through the body are selected from the memory means. Connectivity of two dimensional substructures within each slice is determined independently. Connectivity is indicated by assigning a set of ordered indicia within distinct planar substructures. Connectivity of substructures between adjacent slices is then determined and preferably indicated in a sequence of adjacency tables or in a list of connected pairs of regions. In general, there are n-1 adjacency tables generated, n being the total number of the planar slices. Then, in accordance with an important aspect of the present invention, a list of the ordered indicia in a memory means is permuted in accordance with pairwise entries in said adjacency tables. The permuted list is then used to determine those two dimensional substructures which are connected in three dimensions and which therefore are part of the same three-dimensional structure.

In accordance with another object of the present invention, a method of determining equivalence classes of labeled objects from a list of pairs of related objects within a set of related objects is also provided and comprises the following steps. A set of ordered indicia which are in one-to-one correspondence with the object labels are stored in sequentially adjacent memory locations. Pairs of ordered indicia in the memory locations are switched in correspondence to the labels from the list of pairs of related objects. Those locations in memory which contain the same ordered indicia as are prsent prior to the switching operation, are marked with a first class indicia. Then, the memory is searched for an ordered indicia which has not been marked with a class indicia. From this ordered indicia, a set of related ordered indicia are obtained and marked as belonging to the same class. These steps of accessing, determining, and marking are repeated until each of the memory locations is marked with a unique class indicia. Thus, the memory locations are partitioned into a set of equivalence classes, each class being marked with a unique class indicia. An important aspect of the present method is the determination of related indicia. This is readily accomplished by employing the ordered indicia as a pointer to a memory location containing a related ordered indicia, which is in turn also used as a pointer to a subsequent memory location, thus continuing the process until one of the ordered indicia obtained is the same as has been obtained previously. Each of these sequentially accessed ordered indicia correspond to related elements in the equivalent class.

Accordingly, it is an object of the present invention to display connected substructures within a solid body.

It is also an object of the present invention to provide a system and method for determining connected substructures within a solid body.

It is yet another object of the present invention to extend the capabilities of magnetic resonance imaging systems, computerized tomography systems, positron emission tomography systems, other radiographic emission systems and the like.

It is a still further object of the present invention to provide a graphics preprocessor for the marching cubes and dividing cubes systems.

It is yet another object of the present invention to improve the ability to produce useful, three dimensional representative images for use in medical diagnostic procedures.

It is a still further object of the present invention to provide a means for determining connectivity within solid objects.

Lastly, but not limited hereto, it is an object of the present invention to display selectively isolated substructures, particularly substructures associated with anatomical organs and tissues.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1A:
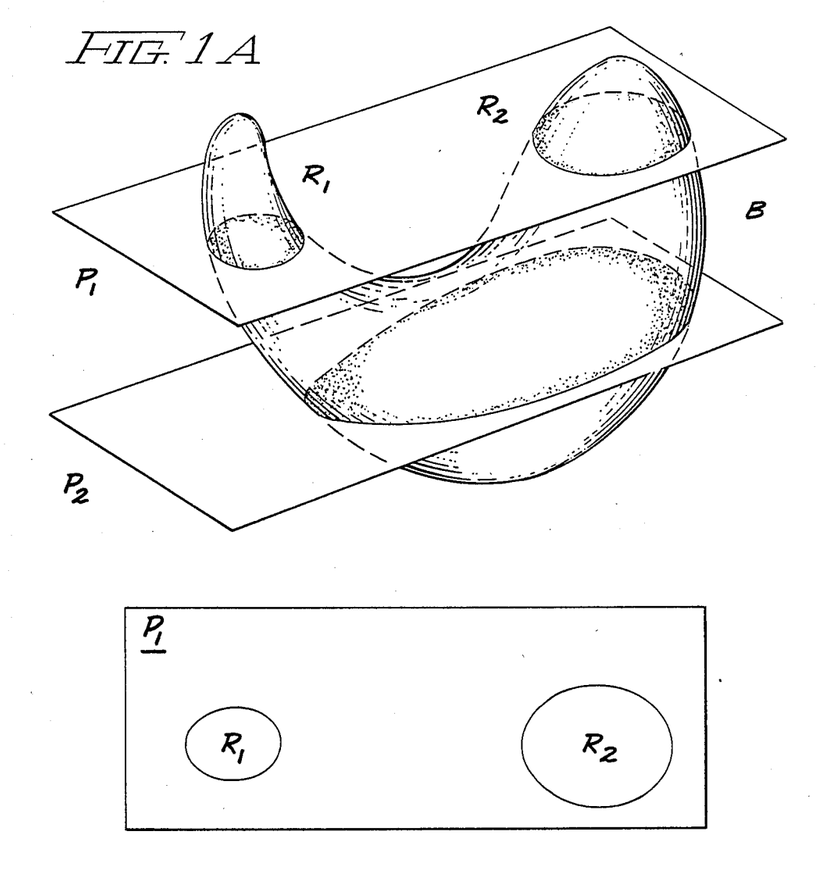
FIG. 1A is an isometric view illustrating the problem of three dimensional connectivity particularly as considered from a sequence of planar slices.

FIG. 1A illustrates one of the problems associated with connectedness determination in three dimensional objects. In particular, FIG. 1A illustrates a body B. In magnetic resonance imaging or computer axial tomographic analysis of a body such as B, data is typically collected from a series of parallel slices, here represented by planes $P_1$ and $P_2$. In plane $P_1$, it is seen that regions $R_1$ and $R_2$ are present. Furthermore, viewing only data from plane $P_1$, it would be concluded that regions $R_1$ and $R_2$ are disconnected and do not contain data elements associated with the same three dimensional object. It is noted herein that the determination for connectedness in a two dimensional region is relatively straightforward. For example, methods for determining connectivity are illustrated in the book "Interactive Computer Graphics" by Foley and Van Dam on pages 446–450 thereof. For example, this may be accomplished by using a simple raster scan of the rectangular array of data elements associated with any given data slice. In fact, the method of the present invention may also be employed to determine connectivity in each plane (see FIG. 9).

Figure 1B:
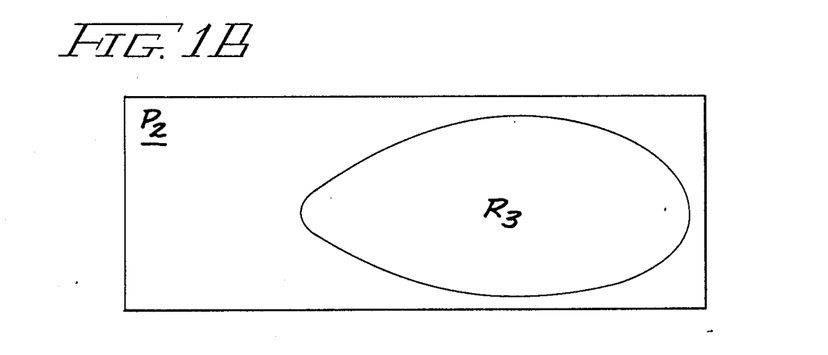
FIG. 1B is a planar view of the two slices shown in isometric view in FIG. 1A.

FIG. 1B provides a plan view of the two planar slices through object B as shown in FIG. 1A. In particular, it is seen that slice or plane $P_1$ includes regions $R_1$ and $R_2$ which are not connected to each other in plane D. Likewise, it is seen that slice $P_2$ includes a region $R_3$. It is seen, from the overlap of regions $R_1$ and $R_3$ and the overlap of regions $R_2$ and $R_3$ that region $R_1$ is connected to region $R_3$ and that region $R_2$ is connected to region $R_3$. It can therefore be deduced that regions $R_1$ and $R_2$ are connected in three dimensional space. For the purposes of display on a CRT screen, it is important to be able to determine all data points which are connected to one another, that is, all data points which comprise a single substructure or, in the medical context, a single anatomical feature such as an organ, bone or blood vessel.

It is seen that connectivity is actually a relationship between planar regions which is described mathematically as an equivalence relation. That is, it is trivially true that each region is connected to itself; likewise, it is also true that if a first region is connected to a second region, then the second region is connected to the first region. Finally, it is seen that if a first region is connected to a second region and the second region is connected to a third region, then the first region is connected to the third region. This latter aspect of an equivalence relation is known as transitivity. This is an important aspect of connectivity since it permits the partitioning of data points (voxels) into a set determined by physical properties associated with substructures within a body being imaged.

It should also be noted that FIGS. 1A and B are merely pictorial representations of a sample body B and tomographic image slices $P_1$ and $P_2$. The actual output from magnetic resonance imaging and CAT scan type devices is a three dimensional array of signal patterns representing the value of at least one physical property associated with data points at regularly spaced grid locations throughout the body. It is also noted that the spacing between image planes $P_1$ and $P_2$ in FIG. 1A is somewhat larger than is typically found; nonetheless, the figure is still highly relevant for purposes of expressing the problem of determining three dimensional connectivity from a sequence of two dimensional slices. It should also be appreciated that FIGS. 1A and 1B illustrate only the presence of a single body. However, in the more general situation, body B is merely one of several geometrically clustered substructures contained within a larger body, the larger body being typified by a human patient in the medical imaging context.

Figure 2A:
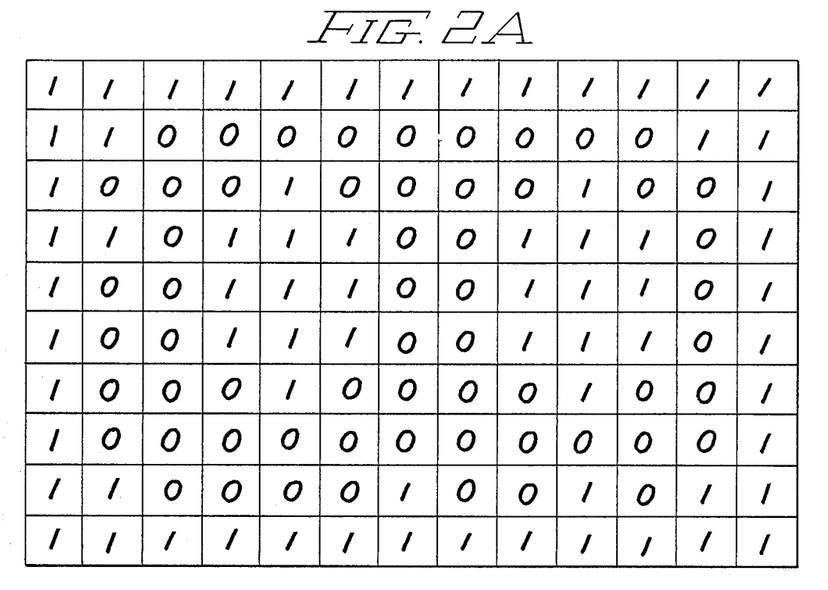
FIG. 2A is a binary array illustrative of regions found within a single slice after thresholding or ranging of data.
Figure 2B:
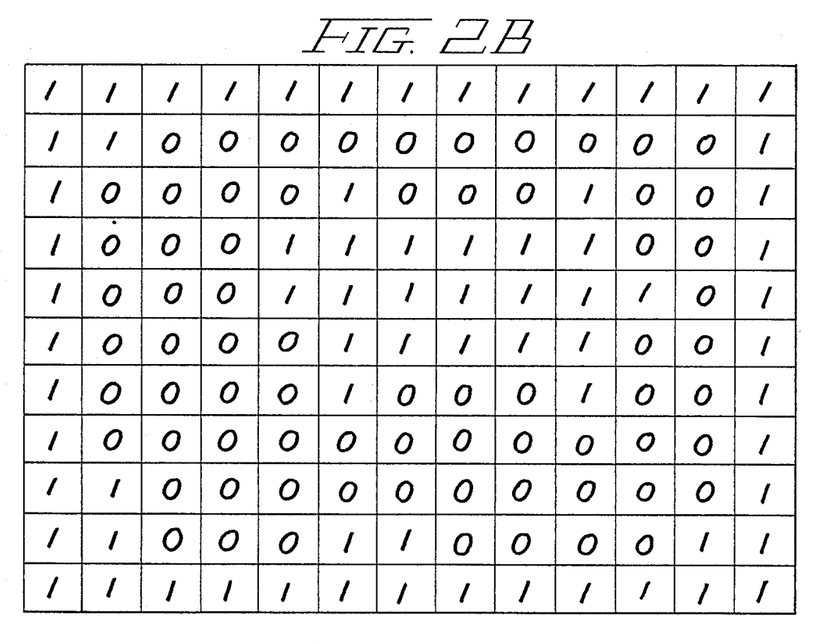
FIG. 2B is similar to FIG. 2A except that it illustrates an adjacent slice.

As indicated above, the output signals from magnetic resonance and CAT scan systems typically comprise a three dimensional array of measurements organized in a sequence of planar slices. The operator is typically permitted to select a range of values or a threshold value associated with a particular tissue type. In this fashion, the array of numbers produced by the imaging system may be converted to an array of binary numbers. In the case illustrated in FIGS. 2A and 2B, the binary number "1" is used to represent those grid locations within the body at which the measured physical property falls within the range selected by the operator. A typical arrangement of such binary data is illustrated in FIGS. 2A and 2B.

Figure 3A:
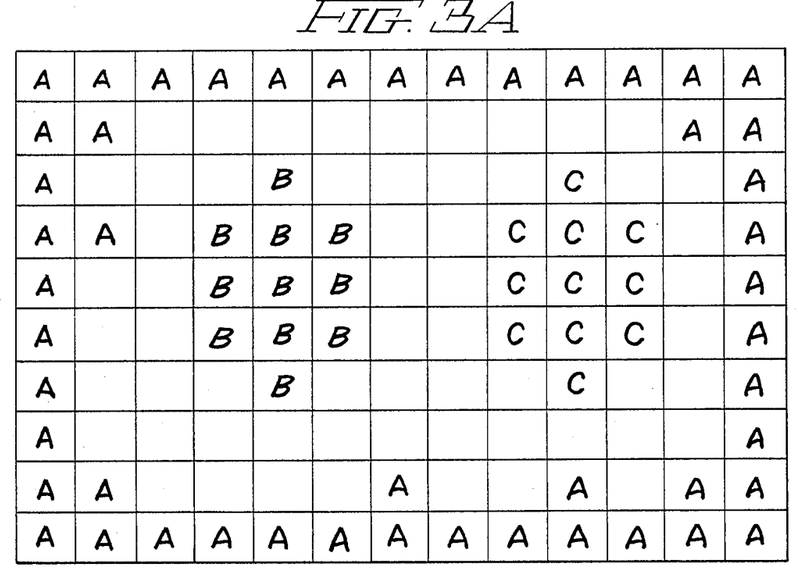
FIG. 3A is an array of data similar to FIG. 2A except that connected regions within the slice are provided with a set of ordered indicia, in particular, the indicia being upper case alphabetic characters.
Figure 3B:
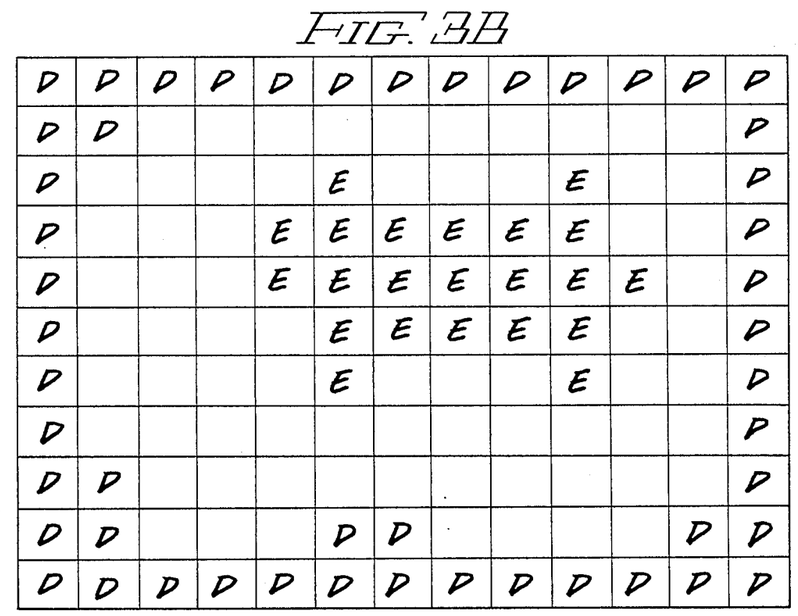
FIG. 3B is similar to FIG. 3A except that it represents an adjacent slice, namely the slice shown in FIG. 2B.

As pointed out above, each slice of this binary data may be analyzed independently of each and every one of the other slices to determine regions in the plane which are connected (to other regions in the same plane). Determination of planar connectivity has already been discussed above and is discussed further below in reference to FIG. 9. In particular, it is seen that it is relatively easy to assign distinctive indicia to each of the regions discerned in the plane. In particular, it is seen that FIG. 3A illustrates this kind of analysis carried out upon the data shown in FIG. 2A. It is also seen that this results in the generation of an array of indicia in which distinctive indicia are assigned to disconnected regions in the plane. More particularly, it is seen that the indicia "A" is assigned to an edge or background region and that indicia "B" and "C" are assigned to interior regions as shown. It is also seen that FIG. 3A roughly corresponds to plane $P_1$ shown in FIG. 1B. It is also noted that the raw measurement data from a machine may also be analyzed to determine planar connectivity; the resulting labeling is also indicated in FIG. 3B. As above, FIG. 3B roughly corresponds to plane $P_2$ in FIG. 1B. Under this correspondence, it is seen that region $R_1$ is labeled "B", region $R_2$ is labeled "C" and region $R_3$ is labeled "E". While it is seen that regions B and C and disconnected in FIG. 3A, it is nonetheless the case that they, together with region E, form a part of a larger, three dimensional structure (assuming the slice are adjacent, of course).

The present invention is particularly directed to a system and method for determination of connectivity of two dimensional regions lying in a sequence of adjacent planes so as to determine those two dimensional regions which correspond to distinct three dimensional substructures contained within a body. More generally, the present invention is also directed to a method for determining equivalence classes of labeled objects from a list of pairs of related objects within a set of labeled objects.

Figure 4A:
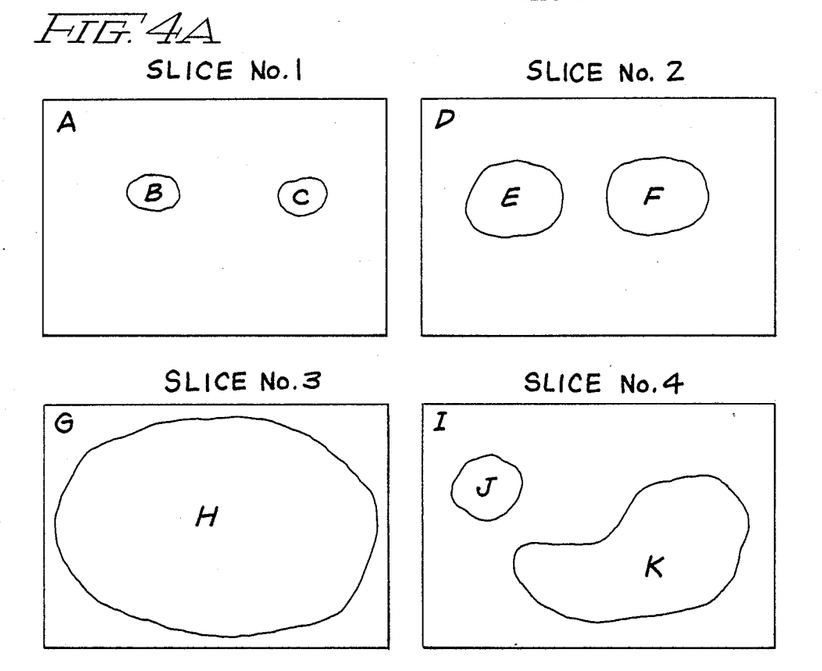
FIG. 4A is a sequence of slices with labeled regions A-K.
Figure 4B:
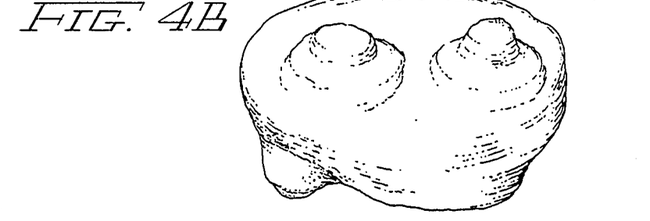
FIG. 4B is an isometric view of an object whose cross-sections are shown in FIG. 4A.

A detailed example of the procedure, particularly in the imaging context, is now presented. Accordingly, attention is now directed to FIG. 4A which illustrates a sequence of four adjacent slices (slice 1–slice 4). Each slice contains a background region (regions A, D, G, and I, respectively for slice 1 through slice 4). Slice 1 is further seen to contain regions B and C; slice 2 is seen to also contain regions E and F; slice 3 is also seen to contain single region H; and slice 4 is also seen to contain regions J and K. FIG. 4A is illustrative of slice information which is obtainable from an object such as that illustrated in FIG. 4B.

Figure 4C:
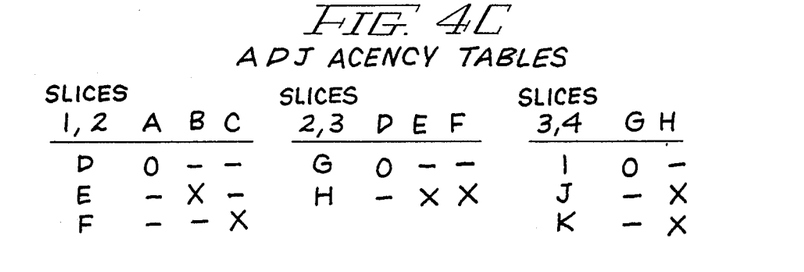
FIG. 4C is a set of adjacency tables corresponding to interplanar connectivity of the slices illustrated in FIG. 4A.

One of the objects of the present invention is the generation of a sequence of adjacency tables, or equivalently, a list of pairs of connected two-dimensional regions. For example, if there are n slices of tomographic data, there are n−1 adjacency tables produced. Each adjacency table includes a number of columns equal to the number of distinct regions found in a first planar slice and a number of columns, the number of columns being equal to the number of regions found in the next adjacent slice. For example, the first adjacency table, as illustrated in FIG. 4C, contains columns labeled A, B and C and rows labeled D, E and F. Since background regions such as A, D, G and I are not particularly relevant, the entries corresponding to these elements in the table may be eliminated or otherwise marked as being disregarded. However, visual inspection of slices 1 and 2 reveal that region B is connected to region E and that region C is connected to region F. It is also seen that region C and region E are not connected and likewise, that regions B and F are also not connected (at least in adjacent slices). The adjacency table for these entries accordingly, is marked as indicated in FIG. 4C (first table). While connectivity between the regions in slice 1 and slice 2 is readily perceived from the human visual perspective simply by viewing the planes in FIG. 4A, it is nonetheless desirous to point out how this may be accomplished in an actual apparatus carrying out the method of the present invention. This is readily done. In particular, as a raster scan of slice 1, for example, is undertaken and as one encounters different regions, corresponding cell locations in an adjacent plane (here slice 2) are examined for their labels. If a specified number of matches exists, say as between regions B and E, the corresponding location in the first adjacency table is marked with an X. The number of pixels that are connected between adjacent slices are measured by scanning both slices and comparing the indicia. A threshold number is established to determine whether the slices are connected. Two regions that overlap less than the threshold number are not considered to be connected. It is seen that in all examination of grid locations in region B, that inspection of the corresponding data element in slice 2 never provides an indication that region F is adjacent. Accordingly, from analyses of this kind, the adjacency tables are completed. In particular, it is seen that completion of the adjacency tables provide indications that region E is connected to region H and that region F is also connected to region H. In the last slice pair examined, it si also seen that region H is connected to regions J and K in slice 4. The corresponding entries are shown in the adjacency tables of FIG. 4C. It should also be noted that the user of the present system is free to select an overlap threshold appropriate for the body being investigated for determining whether or not there is sufficient overlap between regions in adjacent slices in order to label them as being connected. It should also be noted that while the discussion provided above has been couched in terms of the generation of adjacency tables for ease of initial understanding of the method, that it is also proper to consider interslice connectivity determination method described above as producing a list of pairs of regions. Accordingly, for ease of understanding the subsequent description provided herein is presented in terms of a list of pairs of connected regions. In each case, the elements in the ordered pairs in the list comprise regions from adjacent slices. It is from this pair list that the connectivity of all substructures within the body is determined. The particular method for determining this connectivity is discussed below. However, with respect to the specific example of FIG. 4A, it is seen that the ultimate labeling of cell locations is one in which regions A, D, G and I are assigned the class label or indicia of "0" while regions B, C, E, F, H, J and K (since they are all actually connected) are assigned to a single class typically designated by the class indicia "1". In a more general context, multiple substructures within a body would be labeled with different class indicia, such as 1, 2, 3, etc.

Figure 5A:
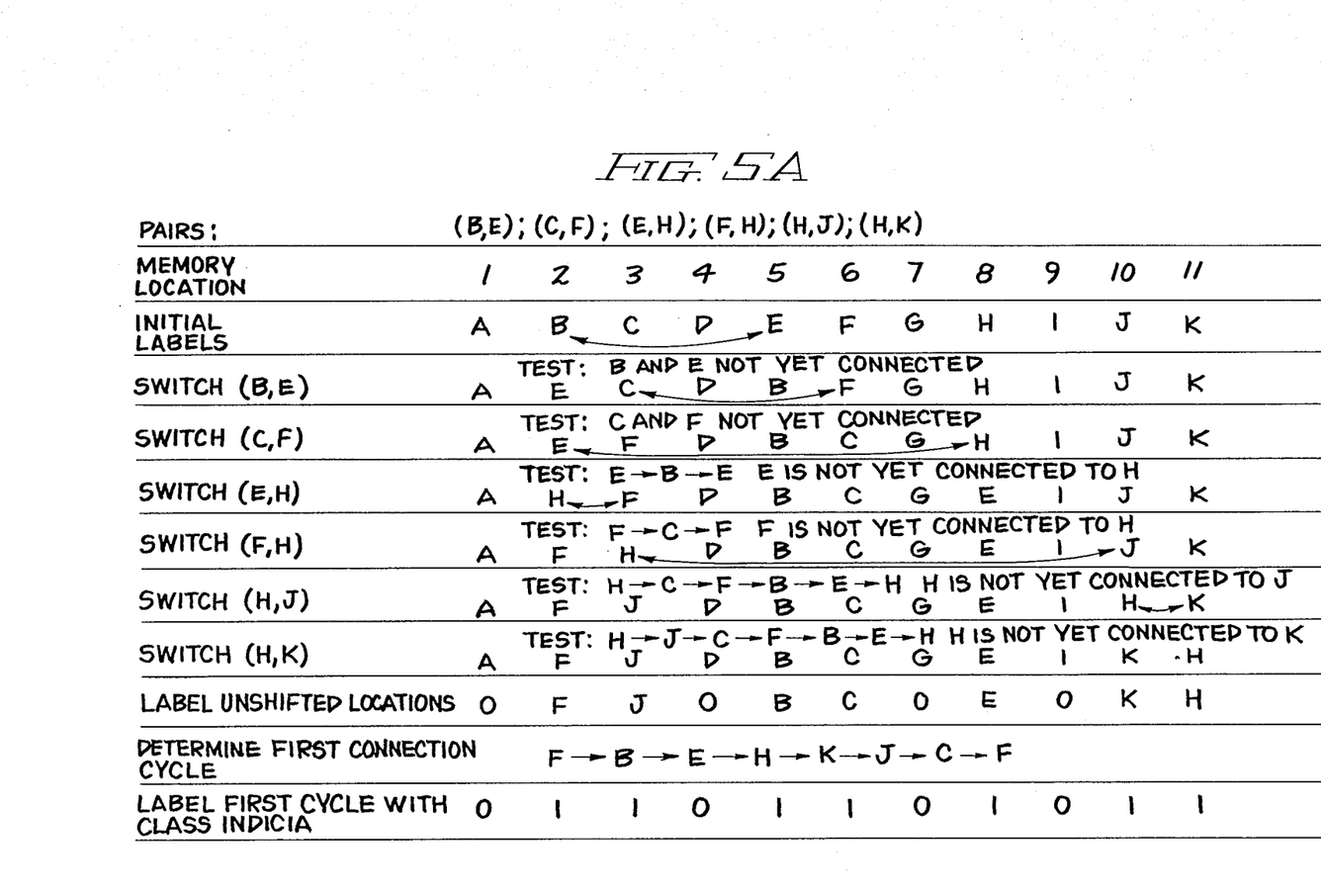
FIG. 5A is an illustration of one embodiment of a method of switching and cycle determination in accordance with the present invention.

Important aspects of the present invention are illustrated in FIGS. 5A through 5D. In particular, FIG. 5A illustrates one specific analysis that may be carried out for the set of adjacency tables in FIG. 4C. In particular, it is seen that the following pair list results from these tables: (B,E); (C,F); (E,H); (F,H); (H,J); and (H,K). It is further seen that there are 11 regions A–K which have been separately identified, in an independent fashion, in the four slices presented. Accordingly, 11 memory locations, such as may be found in a general purpose digital computer, may be set aside or provided. Each of these memory locations is used to store a particular one of the region labels. For the purposes of the present invention, the region labels should comprise an ordered indicia since these indicia are used, as described below, to access memory locations which store labels associated with connected regions. For the examples cited, an 11 cell memory is provided with each of the 11 memory locations being provided with an initial order indicia or label corresponding to one of the regions found. Here the line labeled "initial label" provides an indication of the initial contents of each one of 11 memory locations. The pair list is then used to switch the contents of various memory locations. Since there are six pairs in the pair list, up to six switching operations are performed.

These are illustrated in FIG. 5A. For example, in the first switching operation, labels B and E are switched or permuted since (B,E) is the first item in the pair list. Next, labels C and F are switched. Next, E and H are switched. It is noted herein that the label E has already been switched before, but that now nonetheless, it is switched so as to be stored in position 8 of the memory. Similarly, label 8 is now stored in position 2. In a similar manner, labels F and H are switched; labels H and J are switched; and labels H and K are switched. The result is the following sequence of labels stored in memory in the positions 1-11 respectively: A, F, J, D, B, C, G, E, I, K, H. This is illustrated in FIG. 5A. It is also noted that FIG. 5A also illustrates the occurrence of tests that are made before the positions are switched. As it turns out, for the example of FIG. 4A, the test is passed each time. The test essentially consists of determining whether or not the regions indicated by the specific pair in the list currently being presented is already indicated as being connected. For example, when the time comes to switch labels H and J, a test must be made to determine whether or not H and J are already connected. However, it is seen that H, being in memory position 3, points back to C and that C being in memory position 6, points back to F, that F points to B, that B points to E, and that E points back again to H. Thus, complete cycle has been traversed returning to the starting region, H. It is seen, however, that the regions transversed in the cycle do not include the region J. Accordingly, it is seen that region J is not already connected to H. Accordingly, connection of these regions is appropriately made by switching the H and J labels as indicated. This effectively inserts the region J in the cycle between regions H and C. Such cycle tests are to be performed prior to each switching operation. If it had turned out that H was already connected to J, as being indicated by the label J occurring in the cycle, then switching does not occur and processing passes on to the next item in the pair list. The situation is more particularly illustrated in FIG. 5C.

Next, an analysis of the memory locations is undertaken to determine all of those labels which have not been switched. It is seen that such labels correspond essentially to the background region. Accordingly, these regions are assigned a class indicia, here 0. Accordingly, it is seen that positions 1, 4, 7 and 9 in the memory are set to 0. This corresponds to background regions A, D, G and I. These are indeed seen to be the background regions in slices 1-4 of FIG. 4A.

A very important aspect of the present invention is carried out next. Again, the memory is scanned for the first label which is not "0". In particular, position 2 is seen to contain the label F. This label is used in conjunction with the line in FIG. 5 labeled "initial label". In particular, the label F in the line below the line labeled "switch (H,K)" is now seen to refer to label B (see the line in FIG. 5A labeled initial labels). Likewise, the label B now points to label E. Likewise, label E, originally found in position 5, now points to label H. Similarly, label H, originally found in position 8, now refers to label K. The label K, originally in position 11, now refers to J in position 3. Label J, originally in position 10, now refers to label C. Lastly, label C, originally in position 3, now refers to label F. Thus, using this sequence, a cycle of equivalently labeled regions is generated. In particular the cycle ends when one returns to a label which has already been retrieved. In this particular instance, the following cycle results: F, B, E, H, K, J, C, F. This is also illustrated in FIG. 5A.

Accordingly, all of those labeled regions have now been determined to be connected. Accordingly, those regions are assigned the next available class indicia. In this particular case, the class indicia of "1" is provided. This is illustrated in the last line of FIG. 5A. It is noted that if disconnected substructures were present in the example of FIG. 4, that they too would be indicated. In paritcular, in such an instance, the next step in the method would be to scan the memory locations for non-numeric labels and to repeat the above process of cycle generation until a label is recovered which already has been recovered. Such labeled regions lying in subsequent cycles are assigned distinctive class designations. It should also be noted herein that while alphabetic and numeric labels have been employed herein for the purpose of providing an understanding of the method of the present invention, other labeling schema and marking may be provided. The labeling and marking schema are generally best selected based upon the number of voxel elements and the number of distinct planar regions expected.

It is also seen that the method illustrated in FIG. 5 is generally more applicable to areas beyond connectivity determination for three dimensional objects. In particular, it is seen that the method is capable of determining equivalence classes of labeled objects from a list of pairs of related objects within a set of labeled objects. That is to say, the present invention is capable of partitioning a set of objects into equivalent classes given a list of pairs of objects that are related.

Figure 5B:
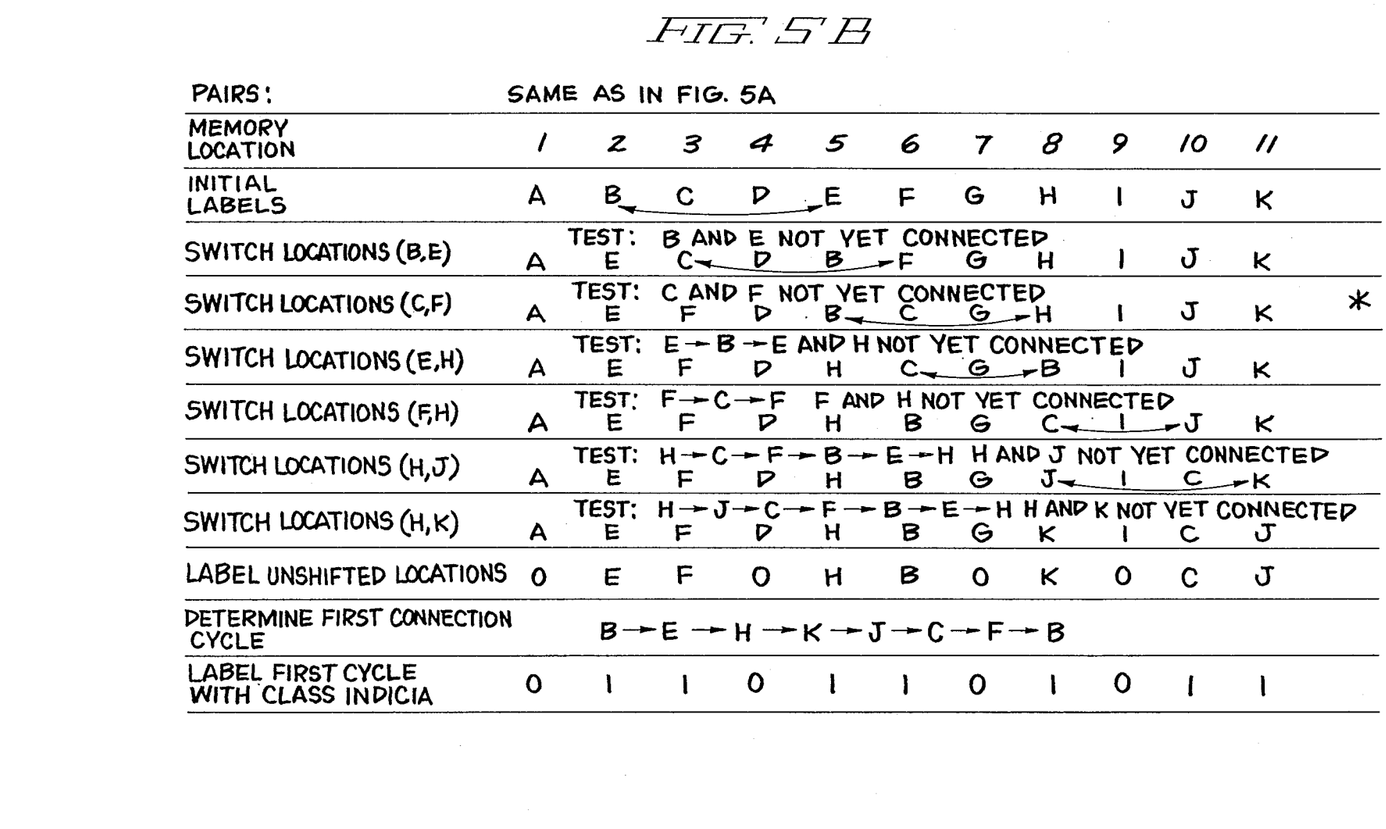
FIG. 5B is an illustration of another embodiment of a method of switching and cycle determination in accordance with a preferred embodiment of the present invention.

FIG. 5B illustrates an alternate and preferred embodiment of the present invention. The same pair list is processed in the illustration of FIG. 5B as was processed in the illustration of FIG. 5A. In the process seen in FIG. 5A, the pair (B,E) was interpreted as meaning: find the memory positions containing the labels B and E and exchange the contents of those memory locations. This is, however, not the preferred embodiment of the present invention since it requires a search through the memory for the labels specified by elements from the pair list. However, elements from the pair list may also be interpreted as indicating a memory address. In this latter embodiment of the present invention, an element from the pair list such as (C,F) is interpreted as follows: go to the memory position whose address is specified by C in the memory location whose address is specified by F and switch the contents of these two memory locations. This embodiment has the the advantage that a search through the memory is not required. Nonetheless, the results are the same. If this latter embodiment is carried out on the pair list indicated in FIG. 5A, no difference in processing is perceived until the pair list element (E,H) is encountered. This processing step is indicated by an asterisk in the lefthand portion of FIG. 5B. It is at this point in the processing that the status of the memory is different. In short, in the process illustrated in FIG. 5A, the pair list is used to address memory locations according to their contents. The process illustrated in FIG. 5B, however, utilizes pair list elements as direct memory addresses, a process which is more expedient and is therefore preferred.

Figure 5C:
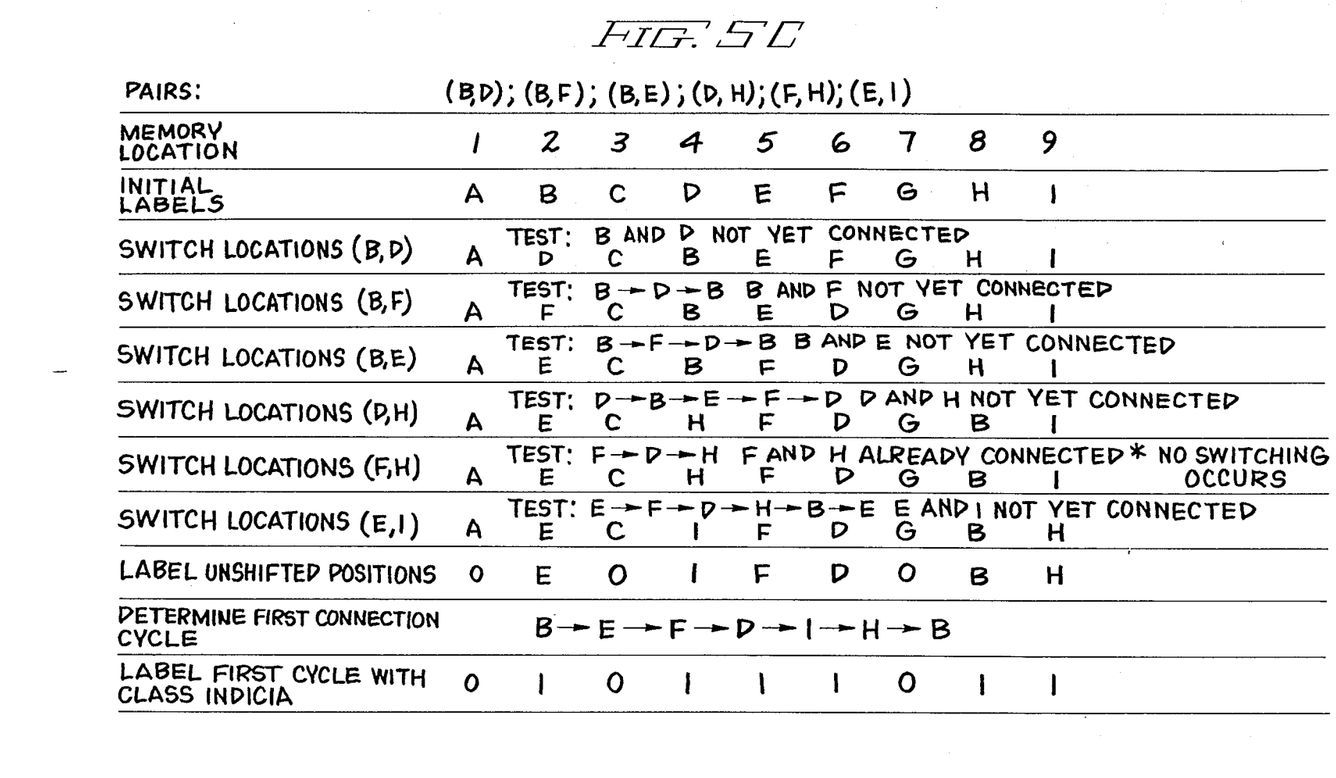
FIG. 5C is an illustration of a preferred embodiment of the present invention particularly illustrating the situation in which a switching operation does not occur since one of the elements in the pair list refers to already connected regions.

As indicated above, prior to performing the indicated switching or exchange operations on the memory cells, it is first necessary to determine whether or not the regions in the pair list are already connected. This is accomplished by starting from the first region in the pair and generating a cycle. If the second region in the pair occurs in the cycle before reoccurence of the first region, then the regions are connected and processing is not carried out for that pair list element. In short, if the regions are already connected, the exchange is not made and processing continues with the next element in the pair list, if any. A situation such as this is indicated in FIG. 5C to the left of the asterisk on the righthand portion of the Figure. In particular, it is seen therein that the regions F and H are already connected and no interchange occurs. It is also noted that the pair list processed in FIG. 5C is different than the pair list processed in FIG. 5A and 5B. It is also noted that the processing method carried out in FIG. 5C is the same method as carried out in FIG. 5B, since this is the preferred method.

Figure 5D:
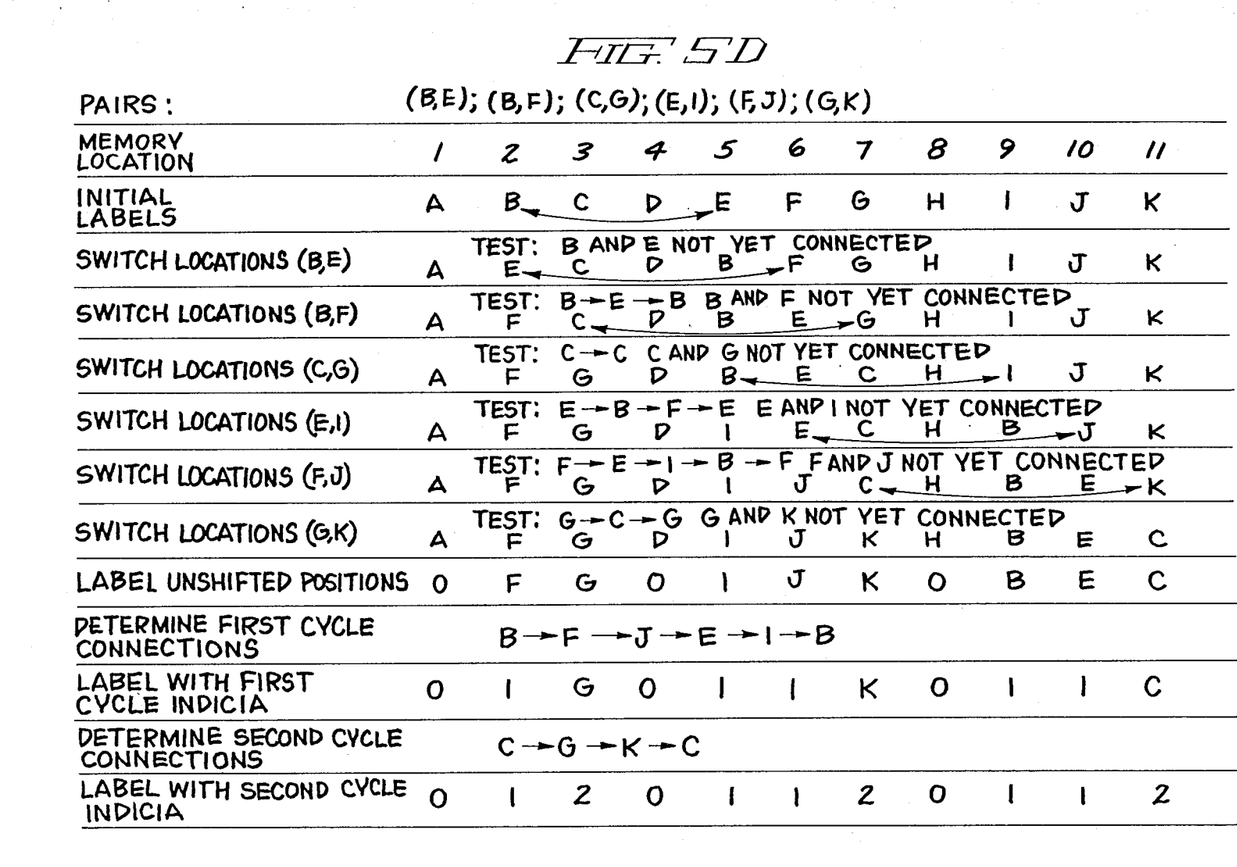
FIG. 5D is an illustration of one embodiment of the present invention particularly showing a circumstance in which two separate and unconnected structures are discerned.

While the sample illustrations shown in FIGS. 5A, 5B, and 5C generally illustrate the principles of the present invention, one of the aspects not illustrated therein is the situation in which a plurality of substructures is found to be present. An example in which this situation occurs is illustrated by the pair list and the resulting processing as illustrated in the FIG. 5D. As in FIGS. 5B and 5C, the processing is carried out in accordance with a preferred embodiment of the present invention. In particular, after initial processing, the memory contents are as follows: A, F, G, D, I, J, K, H, B, E, C. Those memory locations which contain the same labels as initially, are given the background class designation of "0". Starting with the first non 0 location thereafter, it is seen that the cycle B, F, J, E, I, B results. As above, a cycle is indicated when sequential memory referencing returns duplicate labels. However, in the present situation, it is not necessary to test each label returned for duplicate labels; it is only necessary to test for a memory reference which returns a value equivalent to that at the beginning of the cycle. It is noted that this observation speeds processing since testing is simplified. The memory locations in the cycle found are labeled with the next available class indicia, here "numeral 1". The resulting situation is shown in the line of FIG. 5D labeled with an asterisk. It is seen, however, that there are still memory labels amongst the 11 memory locations which contain non-numeric contents. Again, the cycles are tested starting at the first memory location containing alphabetic information, here cell C. The resulting cycle is C, G, K, C. Accordingly, all those cell location containing these letters are labeled with the next available class designation or indicia, here "numeral 2". The resulting list is shown at the bottom of FIG. 5D and provides a mapping from each one of the regions A through K designating each of these regions as belonging to a particular substructure (or background). Thus, it is seen that multiple substructures are readily indicated by the system of the present invention.

Figure 6:
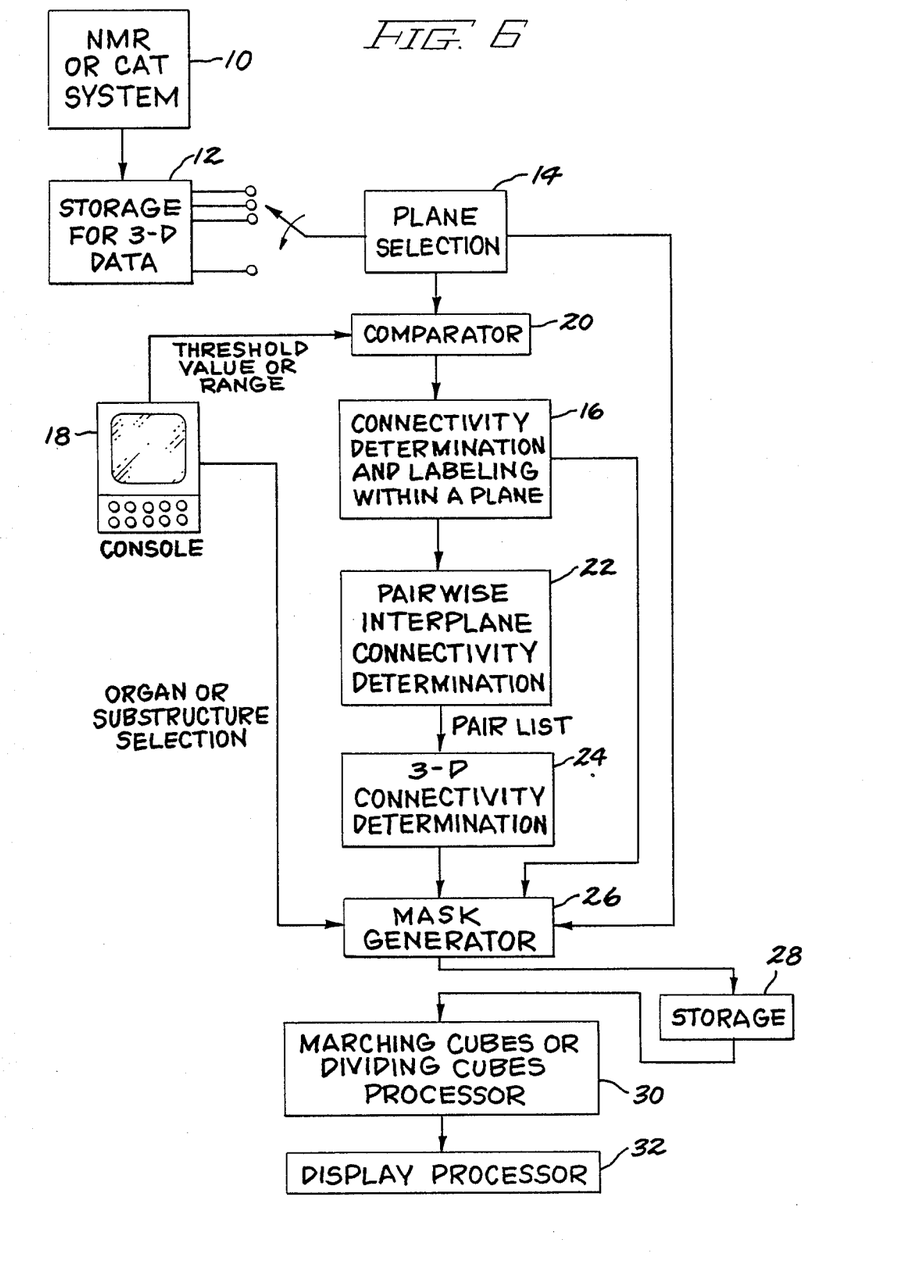
FIG. 6 is a block diagram illustrating an apparatus for carrying out the method of the present invention.

FIG. 6 illustrates a system for carrying out the method of the present invention. In particular, nuclear magnetic resonance or computerized axial tomography system 10 operates to provide measurements of physical properties within a planar slice through a body under study. For example, in the case of CAT x-ray systems, an array of signal values representative of the electron density at various locations within a planar slice is generated. This operation is carried out for a plurality of slices and the data is stored in storage means 12, preferably indexed by slice number. Storage means 12 may comprise magnetic storage media or a random access memory. Plane selection means 14 operates to select data from individual planes, which data is passed on, typically sequentially, to comparator 20 which receives threshold value or range value information from console 18. This threshold value or range is used by the operator to select a desired tissue type. It is noted, however, that comparator 20 is optional and that connectivity determination and region labeling within individual planes may be carried out by means 16 without prior conversion to binary form. In general, however, comparator 20 produces arrays of data such as illustrated in FIGS. 2A and 2B. Connectivity determination and labeling means 16 operates on this data to produce labeled arrays, such as are illustrated in FIGS. 3A and 3B. It is noted that the method of the present invention employing processing of a pair list may also be employed to determine connectivity within a plane. This is illustrated below in the discussion with respect to FIG. 9.

After labeling connected regions within a single plane, pairwise, interplane connectivity determination is made by means 22, as described above. Simple overlap determinations may be made especially in a raster scan of the data cells within a single plane, while at the same time, looking aside (as it were) at corresponding elements in an adjacent plane. The result of this connectivity determination between planes is the production of a pair list which is supplied to three dimensional connectivity determination means 24. Means 24 includes a significant aspect of the present invention and is described in greater detail in FIG. 7, discussed below. The output of means 24 comprises a list which provides a means to map all of the original two dimensional regions from means 16 into a list of class indicia in which each of the regions is relabeled in accordance with three dimensional connectivity considerations. Mask generator means 26 receives organ or substructure selection instructions from console 18. This instruction simply comprises specification of one or more of the class indicia which is used to select those regions which are connected in the three dimensional sense. Accordingly, for this purpose, mask generator 26 employs information generated in planar connectivity determination means 16. Alternately, mask generator means 26 may also employ raw data from plane selection means 14 to generate, preferably for storage in means 28, raw data values associated with planar regions which are selected and connected. This data may be operated upon by a marching cubes or dividing cubes processor 30, or the like, as described in the above-identified patent applications. These signals are then provided to display processor means 32 for generation of realistic three dimensional images on a two dimensional display.

Figure 7:
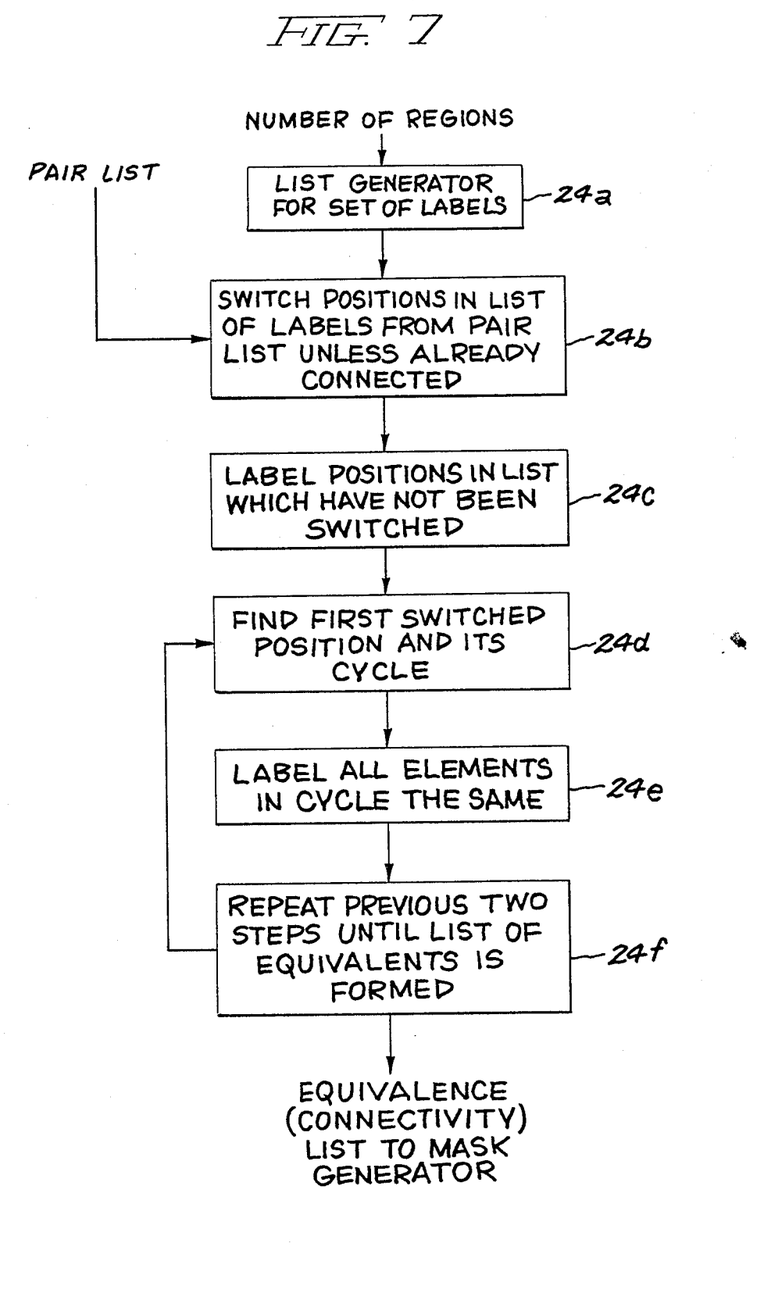
FIG. 7 is a block diagram more particularly illustrating 3D connectivity determination in accordance with the present invention.

FIG. 7 illustrates in more detail, the process carried out by three dimensional connectivity determination means 24. In particular, this means operates to generate a set of labels or ordered indicia and store them in sequential locations in a memory device, typically a random access memory. This operation is carried out in function block 24a. Next, this list is operated upon by means 24b so as to switch positions in the list of labels in accordance with the pair list provided by pairwise interplane connectivity determination means 22. Switching, however, is nonetheless conditional on first testing to see if the regions are already connected, as described above. This operation has been indicated in FIGS. 5A through D above. Next, means 24c operates to label positions in the list which have not been switched. This corresponds to marking, such as with a reference numeral "0", the background region (which is typically not displayed). Next, means 24d operates to find the first position in the list which does not possess a numeric label. This position corresponds to the label associated with a first substructure. This label or ordered indicia, is to used access a subsequent label in the list and this label is in turn, used to access other labels until a duplicate label occurs at which time a closed cycle of connected regions has been determined. All elements in this cycle are then provided with the same class indicia. For example, in the first instance, all label elements in the cycle are assigned the designation "1". Accordingly, this establishes a mapping from all of the two dimensional regions which are labeled into a set of class indicia which operate to collect up all regions which are connected together in the three dimensional sense. This class indicia labeling operation is carried out by means 24e. Lastly, these operation are repeated as indicated by functional block 24f, until the list of all equivalent classes is formed. In short, a vector signal results from functional block 24 which provides a mapping from each of the labeled region A, B, C, ... etc. to a corresponding class indicia, such as, 0, 1, 2, 3, ... etc. In this way, mask generator means 26 can assign appropriate class indicia to each of the two dimensional regions. This being done throughout the three dimensional object, it is seen that the object is essentially partitioned into voxel elements which are associated with different substructures. It should be noted that in the discussions above, the ordered indicia have been described as upper case alphabetic characters and that the class indicia have been described as numeric indicia. It is important to note that these different indicia are used herein for convenience only and that any appropriate marking in keeping with the principles of the present invention may be employed. With respect to the class indicia, it is only important that they are distinct. Typically, a special one of the class indicia is used to designate the background field. With respect to the ordered indicia assigned to the various planar regions, it is noted that it is important that these indicia are in fact ordered so that they can be used as either addresses themselves or as pointers to addresses; the latter is particularly possible if one were to set up a one-to-one table of correspondence between the ordered indicia for the regions and addresses accessing memory locations which have been set aside for containing the region designations.

Figure 8:
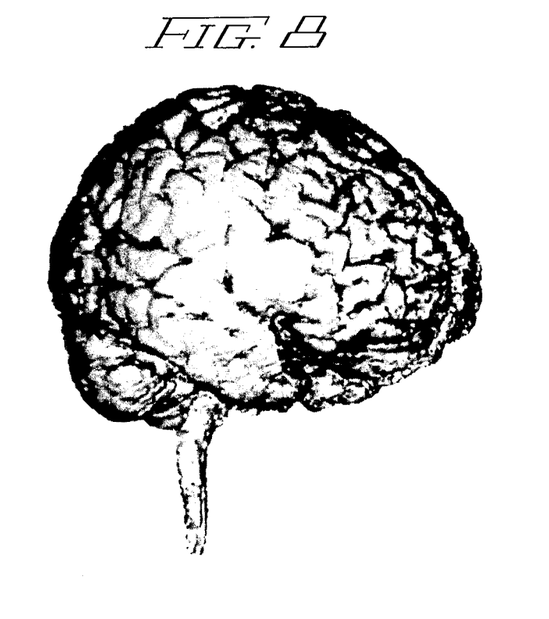
FIG. 8 is a photograph of a computer screen obtained by employing the connectivity system and criteria of the present invention.

The method of the present invention has been applied to magnetic resonance imaging data and has been used to produce shaded two dimensional representations of three dimensional objects. An example of an application of the present invention is illustrated in FIG. 8 in which a human brain has been isolated from its surrounding structures using the connectivity method described herein.

The system for carrying out the present invention has been implemented on conventional digital computer means. In fact, it is pointed out that each of the functional blocks illustrated in FIG. 6 (save for the display screen per se of display processor 22) is readily implementable on currently available digital computers and currently available graphics display devices. Accordingly, in part, the present invention provides a method for operating a digital computation device in a manner so as to produce significantly improved three dimensional images, particularly images of internal bodily organs an advantage which is valuable in a myriad of medical applications. It should also be appreciated that the method and system of the present invention provides particular improvement in performance speed. This is especially important in the area of graphics display systems because of the large amount of computer processing time generally required in graphics work.

Figure 9:
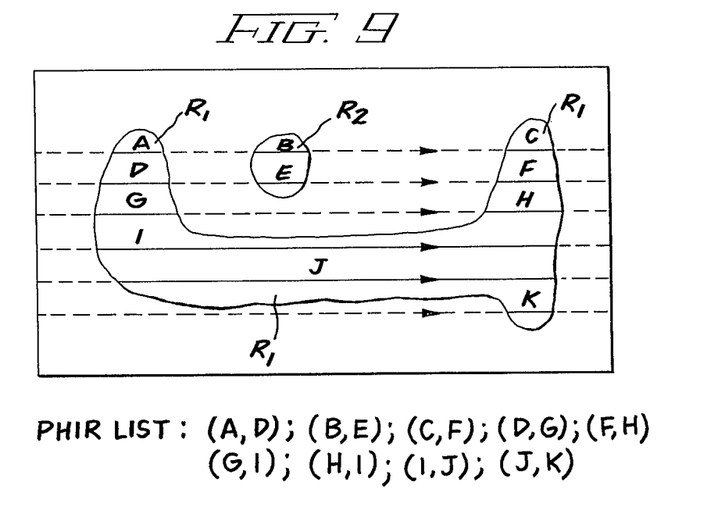
FIG. 9 illustrates the use of part of the method of the present invention used to determine two dimensional connectedness in a planar region.

It has been indicated above that the method of the present invention, particularly as it relates to processing the pair list, is also applicable to determining connectivity of planar regions. In particular, it is seen that the method and apparatus of the present invention may be employed to carry out the purposes of function block 16 in FIG. 6. As an illustration of this, attention is directed to FIG. 9. FIG. 9 illustrates raster scanning of a planar area which includes regions $R_1$ and $R_2$. As the plane is scanned, one dimensional regions A, B and C are discerned. Similarly, in the next scan, one dimensional regions D, E and F are discerned. As above, overlap between these regions lying in adjacent scans will be discerned. In particular, in the instant situation shown, it is seen that one dimensional region A is connected to one dimensional region D; that one dimensional region B is connected to one dimensional region E; and that one dimensional region C is connected to one dimensional region F. Thus, as above, a pair list fs generated and connectivity is ultimately discerned from the pair list in the same manner as carried out above for the full three dimensional case. That this method works for determining connectivity within the plane is readily seen by considering the view in FIG. 9 as merely a top view of a solid object. In this case, the scan lines shown in FIG. 9 represent planar slices made using a slicing plane perpendicular to the plane of the illustration. Since the method of the present invention acts to separate out distinct substructures in three dimensions, it is also seen that it is completely operative in the two dimensional situation illustrated.

From the above, it should be appreciated that the system and method of the present invention provide a significant advance in medical diagnostic imaging systems. More generally, however, it is seen that the system and method of the present invention is also applicable to the determination of substructures within almost any three dimensional object. It is also seen that the system and method of the present invention provides physicians and radiologists with significant new tools in the treatment of disease, injury, and genetic deformity. It is also noted that the system and method of the present invention are not limited to the display of internal organs only, but may also be employed for displaying data associated with chemical and physiological processes, particularly as measured by magnetic resonance imaging and various emission radiography systems.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for determining, in three dimensions, connected substructures within a body, said method comprising the steps of:
   (a) storing, in memory means three-dimensional signal patterns representing the value of at least one physical property, associated with substructures within said body, at regularly spaced grid locations within said body;

(b) selecting signal pattern values, from said memory means, which are associated with slices through said body;

(c) determining connectivity of two-dimensional substructures within each slice independently of connectivity in other slices, said connectivity being indicated by ordered indicia associated with distinct planar substructures;

(d) determining connectivity of said two-dimensional substructures between adjacent slices, said connectivity being indicated in a pair list of connected substructures;

(e) permuting a list of said ordered indicia in a memory means in accordance with said pair list, said permutation being carried out only for those pairs which are not already indicated as being connected;

(f) determining from said permuted list those two-dimensional substructures which are connected.

2. A method for determining equivalence classes of labeled objects from a list of pairs of related objects within a set of such objects, said method comprising the steps of:

storing in sequentially accessible memory locations a set of ordered indicia which are in one to one correspondence with said labels as specified in said list of object pairs;

switching in said memory locations, pairs of ordered indicia corresponding to labels sequentially selected from said list of pairs;

marking, with a first class indicia, those locations in said memory which contain the same ordered indicia as were present prior to said switching step;

accessing from said memory an ordered indicia which has not been marked with a class indicia;

determining from said unmarked ordered indicia a set of related indicia;

marking said memory locations corresponding to said set of related indicia with an indicia corresponding to a next class.

3. The method of claim 2 further including the step of repeating said previous steps of accessing, determining and marking until each of said memory locations is marked with a class indicia.

4. The method of claim 2 in which said determining of a set of related indicia comprises the following steps:

accessing a memory location specified by said ordered indicia to determine a next memory location address, as specified by the ordered indicia in said next memory location;

accessing a memory location with said next memory address;

repeating said previous step until the ordered indicia obtained is the same as an ordered indicia which has been previously obtained.

* * * * *